United States Patent [19]

Baronquel et al.

[11] Patent Number: 5,347,930
[45] Date of Patent: Sep. 20, 1994

[54] METHOD AND INSTALLATION FOR THE DESTRUCTION OF LABORATORY WASTE

[75] Inventors: Pierre Baronquel, Mantes le Jolie; Jean-Louis Biros, Acheres, both of France

[73] Assignee: SARP Industries, Limay, France

[21] Appl. No.: 840,231

[22] Filed: Feb. 24, 1992

[30] Foreign Application Priority Data

Feb. 25, 1991 [FR] France .................. 91 02203

[51] Int. Cl.$^5$ .............................................. F42D 3/00
[52] U.S. Cl. ........................ 102/302; 149/108.4; 149/124
[58] Field of Search ............ 102/302; 149/108.4, 149/124; 252/629

[56] References Cited

U.S. PATENT DOCUMENTS

| | | | |
|---|---|---|---|
| 3,968,723 | 7/1976 | Falterman et al. | 102/23 X |
| 4,498,391 | 2/1985 | Gergo et al. | 102/312 |
| 4,758,387 | 7/1988 | Sayles | 149/109.6 |
| 4,774,026 | 9/1988 | Kitamori et al. | 252/627 |
| 4,834,917 | 5/1989 | Ramm et al. | 252/629 X |
| 4,836,079 | 6/1989 | Barrett | 102/303 X |
| 5,133,877 | 7/1992 | Rofer et al. | 149/124 X |

FOREIGN PATENT DOCUMENTS

| | | |
|---|---|---|
| 0013822 | 12/1978 | European Pat. Off. . |
| 0208660 | 6/1985 | European Pat. Off. . |
| 3837656 | 5/1990 | Fed. Rep. of Germany . |
| 1299192 | 12/1972 | United Kingdom . |

*Primary Examiner*—Peter A. Nelson
*Attorney, Agent, or Firm*—Browdy and Neimark

[57] ABSTRACT

The disclosure relates to a method and installation for the destruction and of containers containing dangerous and noxious laboratory wastes, by explosion in a submerged medium. The automatic treatment installation comprises: at least one basin filled with water for submersion of the containers; means for the automatic conveyance and subsequent submersion of the baskets carrying waste containers; explosion means (explosive fuses and detonators); these means being integrated into a whole complex comprising: an area for the loading of the baskets; a room for the storage of explosives and a room for the storage of the detonators, with safety areas; and a system for the recovery of the broken containers. This method and installation can be applied to the destruction of wastes and products from all laboratories chemicals facilities.

9 Claims, 2 Drawing Sheets

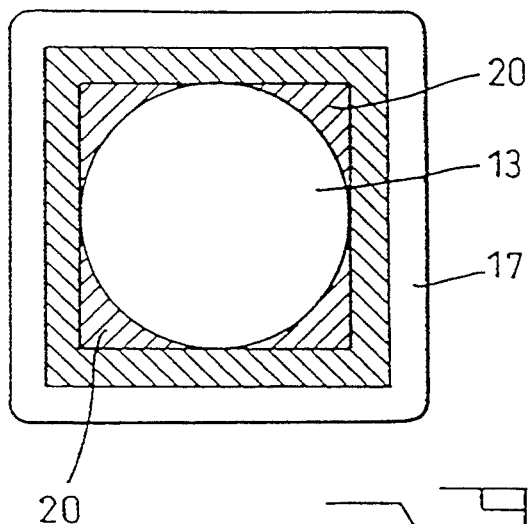
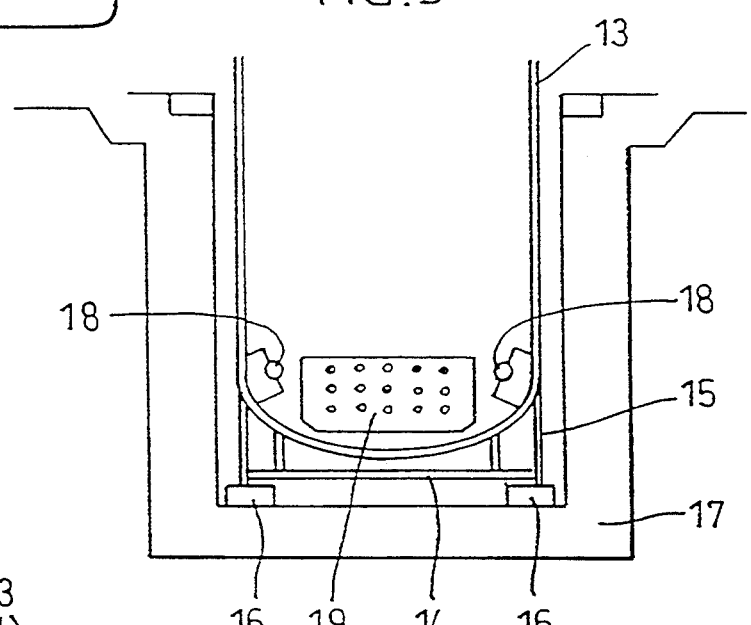
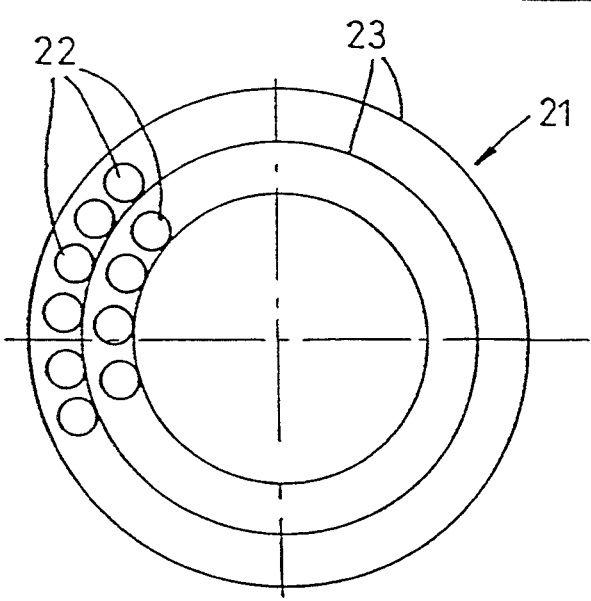
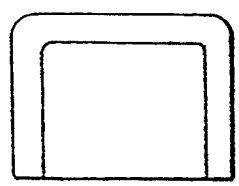
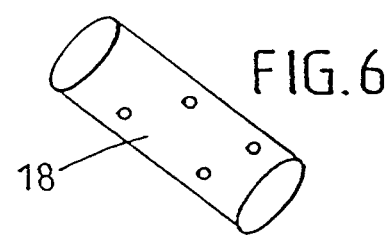

METHOD AND INSTALLATION FOR THE DESTRUCTION OF LABORATORY WASTE

BACKGROUND OF THE INVENTION

1. Field of the Invention

The present invention pertains to the field of noxious waste and residue treatment and relates more particularly to a method and an installation suited to the destruction of containers containing of laboratory wastes.

2. Description of the Prior Art

It is known that wastes and residues from various reactions and processing operations, generated in laboratories or small installations, are characterised by the fact that they are greatly varied in their composition and are produced in small unit quantities ranging, for example, from some hundreds of grams to a maximum of some kilograms. These wastes, which is most usually noxious or polluting substances, are generally collected in receptacles made of a variety of materials such as glass, composite materials, plastics, metal etc.

The handling operations known to date for getting rid of these wastes generally consist of opening the containers by hand, then analysing each set of contents if necessary and, finally, carrying out the treatment itself which needs to be adapted to each type and form (solid, liquid, powdery etc.) of waste.

These handling operations are very often extremely dangerous, notably during the opening of the receptacles which may allow toxic vapours to be exhaled or may contain products that are aggressive to the skin. They therefore call for infinite precaution and, in particular, require the wearing of special protective clothing. Furthermore, they entail substantial costs both in the numerous analyses needed and during the destructive treatment which has to be adapted to each particular case or group of wastes.

The main objective of the invention is to provide a method and an installation to implement this method, making it possible to overcome of all the above-mentioned drawbacks by eliminating any manual action or any prior analysis, by destroying the containers, automatically and recovering the destroyed materials, without any danger related to handling.

According to the principal and broadest definition of the method, the shock wave created by an explosion in a submerged medium is used to break containers such as flasks or similar containers holding dangerous products and wastes.

More precisely, the method according to the invention is one wherein the flasks, arranged in rows in baskets with metal grating, with interposed detonating fuses, are submerged in a basin and subjected to an explosion in relatively deep water, after which the baskets are lifted and subjected to a washing operation, the destroyed flasks being recycled or sent to the waste dump, while the wastes which have collected and/or have been gradually diluted in the basin are periodically removed and treated in a manner known manner.

It is known that the explosion, in water, of a detonating product is characterised by the creation of a shock wave and then the appearance of a pressure gas bubble. The shock wave conveys the maximum energy; however, the secondary pulsation pressures of the bubble have a more prolonged effect. It is precisely this type of explosion that is implemented to prompt the breakage of the containers of noxious wastes by using the shock waves that accompany the formation of gas bubbles. Since the operation is done in a submerged medium, the gases that may be generated during the breakage of the flasks are washed in the water of the basin. Furthermore, the gas currents produced when the bubbles break are used as means for the natural agitation of water in the basin or pool.

For the proper implementation of this method, it is appropriate to use explosive materials capable of withstanding submersion in pool water for at least one minute. An explosive such as penthrite is quite suited to this purpose but other materials that meet the above-mentioned condition are also suitable. An appropriate detonator is placed against the explosive fuse or fuses and it is necessary, as shall be explained further below, to determine, for each specific application, the maximum quantity of explosive and detonator required as a function of the volume of the pool and the number of flasks (or equivalent containers) to be treated in each blasting operation.

The depth to which the baskets of flasks and the associated detonating fuses must be submerged is a critical factor. Indeed, it is important that the gas bubble which is generated by the shock wave and which generally assumes a spherical shape should be able to break or burst on the surface of the water before attacking the wall of the basin so as to avoid the problems of pulsation of bubbles and, hence, to avoid the phenomena of resonance. It is also important to prevent excess pressure from being exerted on the walls of the basin through the expansion of gases. During trials carried out by the Applicant, and on the basis of the installation that shall be described hereinafter by way of an example, it has been determined that the depth of submersion should be at least one meter and that it is generally from one meter to 2.5 meters.

SUMMARY OF THE INVENTION

In accordance with the invention, an installation for the destruction of laboratory wastes essentially comprises:

(a) at least one basin or pool filled with water to a depth of at least two meters;

(b) means to convey and submerge flasks, or similar containers of wastes, in water and (c) associated means to bring about the explosion of the containers at a predetermined point in time.

According to a preferred embodiment, the pool is formed by a first vessel, made of a corrosion-resistant material, mounted by damping means within a second vessel, made of concrete or similar material, notably acting as a retention basin.

In practice, the first tank, made of steel or of a similar material with a sufficient thickness of at least 20 mm, is provided on its internal rim with a perforated conduit aimed at recovering the gases generated during the explosions and at enabling them to be recycled at the bottom of the vessel in order to create a rising current of mini-bubbles in the vessel. Furthermore, this vessel is advantageously provided with a means of protection against splashes of liquid and for the safety of the operator or operators. For example, this means may be constituted by an expanded metal sheet, some tens of centimeters wide, positioned on the periphery of the vessel.

The means for the storage and submersion of the waste containers in the water of the first vessel consists of a series of metal baskets, carried by conveyance rails and preferably made of grating with meshes that are small enough to hold back the scraps and pieces of containers, notably when they are constituted by glass flasks. It has been noted, during designing and trials, that it is preferable to arrange the containers in several (at least two) concentric rows in a circular or elliptical configuration so as to optimize the quantity of explosives necessary to destroy the greatest quantity of receptacles. The explosive fuse is positioned between the rows of containers, there being a space of about 1 to 3 cm between two rows. The baskets are advantageously provided with a detachable lid so that the containers, which are emptied after the explosion, do not float to the surface of the water. Advantageously, a larger sized basket with very small meshes may be placed at the bottom of the first vessel in order to receive the small splinters of glass.

BRIEF DESCRIPTION OF THE DRAWINGS

The invention shall be understood more clearly from a detailed description of a non-restrictive exemplary embodiment, illustrated by the appended drawings which give schematic views as follows:

FIG. 2 shows a top view of a submersion basin for the containers;

FIG. 3 shows a sectional view of the basin of FIG. 2, especially illustrating the internal vessel and its main equipment;

FIG. 4 shows a top view of an arrangement of the containers to be destroyed in their conveyance basket;

FIG. 5 shows a variant of the structure of a conveyance basket;

FIG. 6 shows a more detailed view of the type of conduit fitted into the internal vessel of FIG. 3.

MORE DETAILED DESCRIPTION

Figure 1:
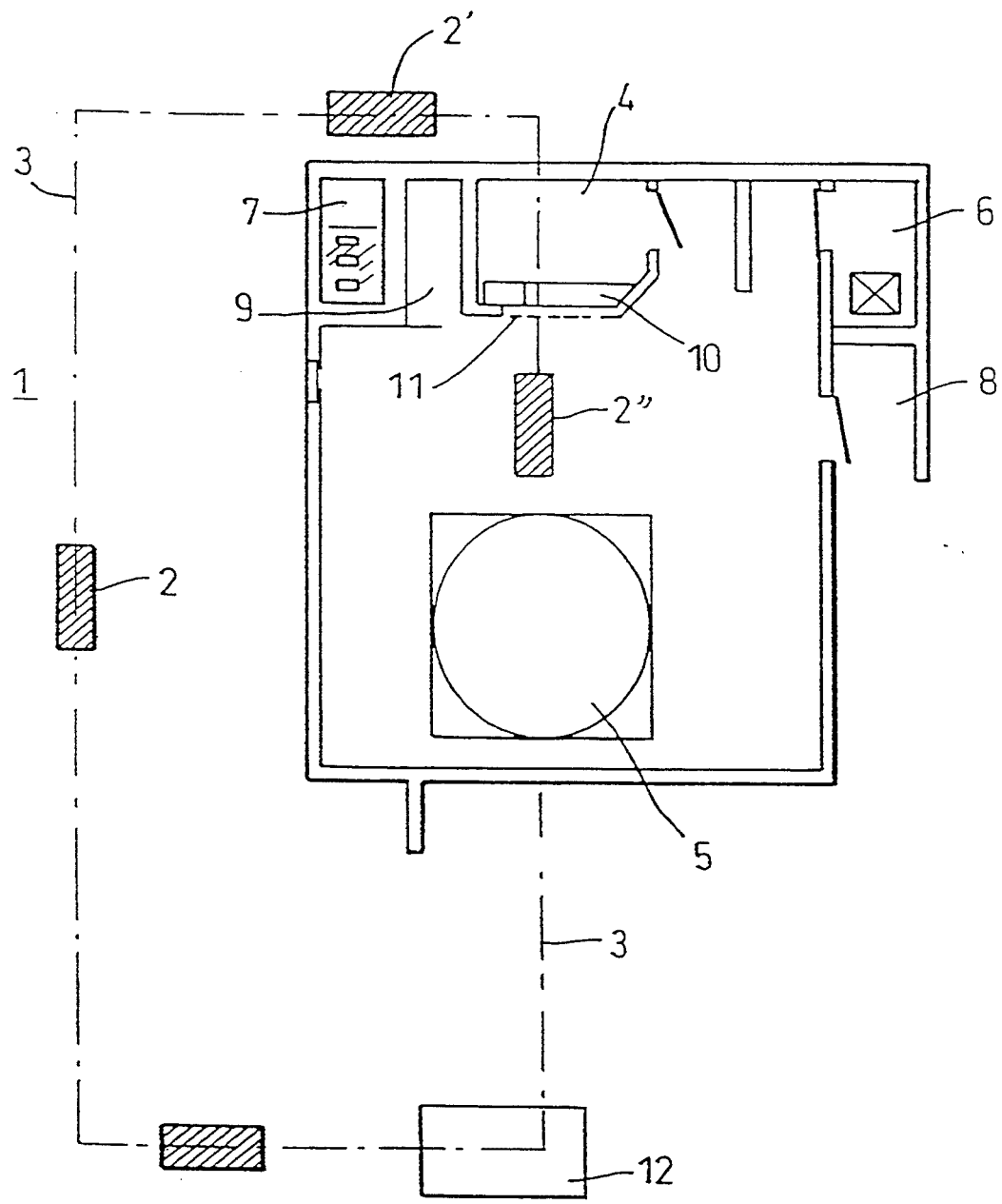
FIG. 1 shows an installation for the destruction of waste containers, by explosive means, with the main auxiliary buildings of its layout in an appropriate treatment area.

In the general installation shown schematically in FIG. 1, the containers, for example bottles filled with wastes to be destroyed, are loaded from an appropriate area 1 into series of storage baskets (of which only one, which is in circulation and is referenced 2, has been shown for reasons of simplification) conveyed by a conveyor rail 3. Once loaded with bottles, the basket at position 2' goes through a control room 4 and and stops at the position 2" between the room 4 and the pool 5. In this position 2", the basket is brought down to a distance of about one meter from the ground. The pyrotechnist or explosives expert in charge of the operation places the explosive fuse in contact with the bottles, as shall be explained further below. The fuses are stored in the room 6 while the detonators are stored in the room 7, each of these rooms being naturally provided with safety lock chambers or areas 8, 9. The explosives expert then fetches the detonator from the room 7 and positions it on the fuse. He then returns to the control room 4 which has a firing unit 10 with a view port 11. Then, by remote control, the explosives expert moves the basket at position 2" towards the centre of the pool 5 and proceeds to on-line control when the basket is above the pool. This is so that the glass splinters can be discharged into the water in the event of untimely blasting. The basket at position 2" is then brought down in the water to a depth of about one meter, and then the blasting is done. The lifting of the basket out of the pool is advantageously followed by a rinsing (not shown here) before the broken containers are removed to a lower recovery point 12.

In practice, the water level in the pool is at least two meters deep, for example 2.5 to 3 m, and the corresponding volume of water is at least 20 m$^3$. For each basket of flasks, as shall be explained hereinafter, the quantity of explosive, for example penthrite, is generally between 7 g and 10 g for a detonator weight of about 0.4 to 0.8 g for example of the N28B type).

The pool used for the blasts, as shown herein in FIGS. 2 and 3, includes a first vessel 13 lying on a raft 14 by means of a skirt 15 and damping means 16 of the silent-block or similar type. The vessel is itself made inside a basin or second vessel 17, preferably made of concrete and used as a retention basin. The vessel 13 is provided with a perforated conduit or pipe 18 used as a guide for the circulation of the gases. These gases are sent back into the bottom of the vessel and go through a perforated plate 19 to create a rising current of mini-bubbles in the blasting vessel 13. There is provision for a protection plate 20 around the vessel 13 for safety reasons.

The basket 21, designed to store and convey the flasks and other containers, is made of a metal grating with small meshes. It may have various shapes, for example circular (FIG. 4) or parallelepiped (FIG. 5) or, again, elliptical (not shown herein). Each basket has several rows of flasks 22 (two of which are shown in FIG. 4). The explosive fuse 23 is interposed at a short distance, for example 1 to 2 cm, between each row of flasks. In practice, the mass of explosive fuse and the detonator, for each basket, is generally kept at a maximum of 10 g for a basket capable of containing 70 flasks.

The flasks (or other containers) destroyed by the explosion in a submerged medium are either recycled (for example in the case of glass) sent to the waste dump, or solidified with the waste using known techniques of solidification.

Since the waste concentration gradually increases in the blasting vessel 13, it has to be emptied periodically, for example, when the waste concentration reaches 15 to 25%.

According to this invention, it is possible to have an automatic unit that can destroy a large quantity of flasks per hour and which minimizes the work force necessary to operate this installation. For example, on the basis of the above-mentioned principles, the Applicant has designed a general installation for the destruction of 2000 one-liter flasks per 8-hour period.

What is claimed is:

1. An apparatus for destroying containers containing wastes comprising:
   (a) at least one basin or pool filled with water to a depth of at least two meters;
   (b) means for automatically conveying and submerging containers of wastes into the water of said basin; and
   (c) means, associated with said means for conveying and submerging, for bringing about the explosion to destroy the containers at a predetermined instant.

2. An apparatus for destroying containers containing wastes as recited in claim 4, wherein means for bringing about the explosion is comprised of continuous explosive fuses positioned between rows of containers, and a detonator positioned on a fuse.

3. An apparatus for destroying containers containing wastes as recited in claim 2, further comprising:

an area for loading said means for conveying and submerging;

a room for storing said explosive fuses;

a room for storing said detonators;

safety areas for said rooms; and means for recovering broken containers.

4. An apparatus for destroying containers containing wastes comprising:

at least one basin or pool filled with water to a depth of at least two meters, said basin or pool comprising a first vessel of corrosion-resistant material, having an inner and an outer peripheral wall, being filled with the water and mounted on a damping means within a second vessel made of concrete or similar material;

means for automatically conveying and submerging flasks or similar containers of wastes into the water of said basin; and means, associated with said means for conveying and submerging, for initiating an explosion at a predetermined point in time.

5. An apparatus as recited in claim 4, wherein:

said inner peripheral wall of said first vessel is provided with a perforated conduit where gases generated within the water are drawn in and recycled to the bottom of said first vessel creating a rising current of bubbles; and said outer peripheral wall of said first vessel is attached to a means for protecting against splashing liquids.

6. An apparatus for destroying containers containing wastes, comprising:

at least one basin or pool filled with water to a depth of at least two meters;

means for automatically conveying and submerging flasks or similar containers of wastes into the water of said basin, wherein said means for conveying and submerging flasks or similar containers having baskets with fine metal grating and having the flasks for containers arranged in at least two concentric rows in a circular or elliptical configuration, and wherein said baskets are conveyed to said basin by an automated conveyance rail; and means, associated with said means for conveying and submerging, for initiating an explosion at a predetermined point in time.

7. A method for destroying containers containing wastes, comprising the steps of:

conveying a basket made of fine metal grating and carrying containers arranged in rows and having toxic wastes therewithin;

providing detonating fuses interposed between said rows of containers;

thereafter submerging said basket in a water-filled basin followed by exploding said detonating fuses;

lifting said basket and washing said basket; and collecting and diluting the wastes released upon the destruction of said flasks or similar containers in said water-filled basin for periodic removal.

8. A method for destroying containers containing wastes as recited in claim 7, wherein the step of providing detonating fuses comprises selecting explosive fuses and associated detonators capable of withstanding submersion in water for least one minute.

9. A method for destroying containers containing wastes as recited in claim 7, wherein the step of submerging said basket in a water-filled basin comprises submerging said basket in water to a depth of at least one meter.

* * * * *